Jan. 26, 1965 L. KOPITO 3,167,014

BRIDGE WIRE FOR PRODUCING HIGH TEMPERATURE EXPLOSION

Filed Oct. 5, 1961

INVENTOR.
LOUIS KOPITO
BY
Morse + Altman
ATTORNEYS

United States Patent Office 3,167,014

Patented Jan. 26, 1965

3,167,014

BRIDGE WIRE FOR PRODUCING HIGH TEMPERATURE EXPLOSION

Louis Kopito, Brookline, Mass., assignor to Baird-Atomic, Inc., Cambridge, Mass., a corporation of Massachusetts Filed Oct. 5, 1961, Ser. No. 143,221
6 Claims. (Cl. 102—28)

Figure 1:
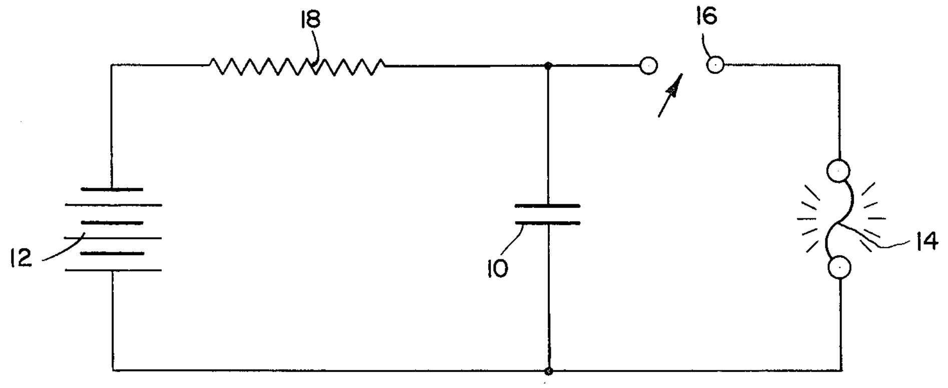

This invention relates in general to a novel method and apparatus for producing a high temperature explosion of very short duration and more particularly concerns the use of a graphite filament or filaments or graphite areas in an exploding wire circuit for the purpose of generating a light flash of intense brilliance accompanied by extremely high temperatures and shock waves.

The phenomenon of exploding metal wires has been known for a number of years and has been considered as a useful source of illumination where a light output of high intensity and short duration is required.

In practice, one or more fine metal wires are exploded by connecting them in an electrical circuit in which the wire is the most highly resistive part. Application of a pulse of high electrical energy to the wire will cause it to undergo a rapid temperature change resulting in vaporization of the wire accompanied by a high level output of light of very short duration and shock waves.

Heretofore, exploding wires, as a source of short lived heat, light and shock waves have been limited in their utility by reason of the fact that the wire itself is destroyed in the explosion, and must be replaced each time the process is repeated. Furthermore, the temperature, shock waves and light output of exploded metal wires cannot exceed certain limits because of the melting and/or sublimation point of metal and alloys. Since all metals display positive coefficients of electrical conduction, resistance of the wire increases and electrical conductivity decreases as temperature rises. As a result there is a lesser working limit to the amount of electrical energy that can be applied usefully to the wire.

Accordingly, it is an object of the present invention to provide a new and improved method for generating short lived bursts of extremely high temperatures accompanied by shock waves and an emission of light of intense brilliance.

Another object of this invention is to provide a novel wire exploding apparatus which may be operated repeatedly without destruction of the wire.

Yet another object of this invention is to provide a significant increase in the amount of heat, light and shock wave output of electrically exploded wires.

More particularly, this invention features an exploding wire circuit in which the explodable element is graphite material fabricated in the form of a single filament which may be combined with other filaments into a strand or alternatively the strands may be woven into a section of cloth. A graphite element in a circuit adapted to deliver a pulse of high electrical potential is capable of generating shockwaves together with a light flash of greater intensity and a temperature level considerably higher than that available from a similar circuit employing a metal explodable element such as copper, silver or platinum.

Figure 2:
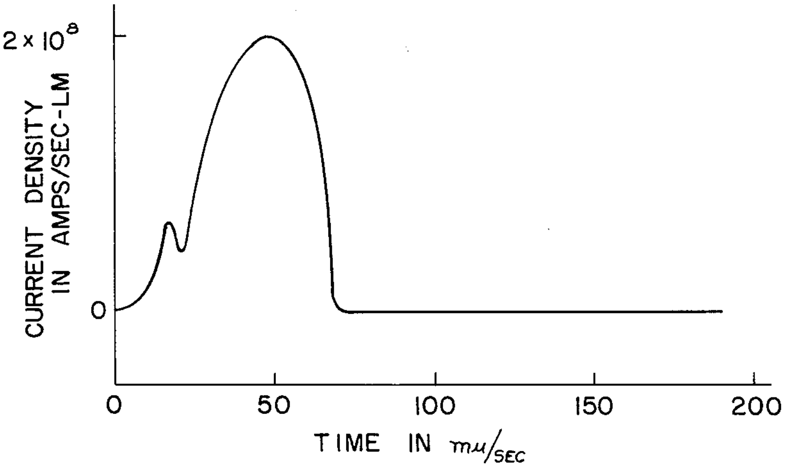

But these and other features of the invention, along with further objects and advantages thereof, will become more readily apparent from the following detailed description taken in connection with the accompanying drawings in which:

FIG. 1 is a schematic diagram of a circuit that may be employed to explode a graphite element, and FIG. 2 is a graph on which is plotted a time versus current curve.

Referring now to FIG. 1, a simplified system for carrying out the invention typically includes a condenser 10 charged from a power source 12 and dischargeable through an element 14. A switching device 16 and a resistor 18 completes the basic requirements for the circuit.

Operating parameters for the circuit may be selected from a very wide range of values, according to the particular results desired. By way of illustration, the applied voltage may be varied from a relatively low potential of 4000 volts up to voltages in the 25 kv. range. The capacitance of the condenser 10 may range from 2000 $\mu\mu$fd. to 2000 fd. for example. Since the element 14 is normally of a very low resistance and inductance, the condenser 10 and the remainder of the circuit components should also be designed with low inductance and resistance. Thyratron tubes or triggered gap switches for example, may be employed as the switching device depending upon the particular application and conditions.

In the practice of this invention, the element 14 is fabricated from filaments or strands of a graphite material such as that available from the National Carbon Company and used in a woven or felted fabric which is sold under the trade designation "Graphite Cloth." This material is formed from fibers of high purity graphite carbon having a tensile strength in the 50,000 to 100,000 p.s.i. range and characterized by high thermal conductivity and good electrical conductivity. The graphite fibers may be produced by processing carbonaceous materials at temperatures up to 5400° F.

Normally such graphite fibers have an ash content of approximately 0.04% composed principally of magnesium and aluminum with traces of calcium, iron, manganese, silicon, boron, copper, nickel and sodium. The material sublimes at approximately 6600° F. (3650° C.) without melting. Each graphite filament is composed of approximately 1400 individual fibers each of a generally circular cross section and each approximately 8 to 10 microns in diameter.

The high melting point of the graphite material together with its low thermal mass, its negative coefficient of electrical conductivity, its excellent black body characteristics and the fineness of its fibers, all contribute to produce an exploding wire effect that is several magnitudes greater than that obtainable from a metal wire when a pulse of high electrical energy is applied.

It will be appreciated that the ability of the graphite filament to radiate a large quantity of light is greatly enhanced by reason of the fact that the filament is composed of a large number of fine fibers. Since each fiber displays a very high emissivity rating, the total emission of the entire filament will exceed by a substantial measure the light output generated by a solid conductor having the same diameter as the graphite filament.

In practice, when the circuit is closed by means of the switch 16, a heavy flow of current of short duration passes through the graphite filament 14. As suggested in FIG. 2, the current rises at a rate of approximately $10^{11}$ amp./sec., for example, and the current density increases at the rate of $10^{17}$ amp./sec.-cm.$^2$ to reach a peak density of about $2\times10^8$ amp./sec.-cm.$^2$. The power input for such current densities would be in the tens of megawatt range. The elapsed time involved in the explosion is extremely short, typically being in the order of 50 to 70 M$\mu$ sec.

When a relatively low voltage about 4000 volts together with a capacitance in the neighborhood of 375 $\mu$fd., is applied to the graphite filament, an explosive effect is generated without destruction of the filament. In the case of a metal wire such a voltage input would produce an explosion of low intensity along with destruction of the wire. In contrast, the graphite filament will produce a much more intense explosion which may be repeated immediately using the same filament. At higher voltages, however, the graphite filament will be destroyed in the explosion process.

The explosion effect produced by a circuit such as that described above may be explained on the following basis:

A large quantity of electrical energy is delivered to the filament in a fraction of a microsecond and is converted into heat energy by making the filament the most highly resistive part of the circuit. Since the mass of the filament is quite small, the graphite will traverse a rapid temperature transient before the heat can escape. In this transient stage the graphite changes from ambient conditions to a vapor phase and returns to the solid state within a fraction of a millisecond. To produce the high temperature which is characteristic of these explosions it is necessary to add energy to the system at a rate that will exceed the rate of energy loss through radiation and other causes. Typically, temperatures in the range of 100,000° K may be obtained by exploding graphite filaments with short pulses of high voltage current.

Since the graphite filament displays a negative coefficient of electrical conductivity, it, of course, conducts a current better as the temperature rises. In contrast, all metals have positive coefficients so that their conductivity decreases with a rise in temperature.

In designing the circuit for exploding a graphite filament considerable attention should be directed towards the switching device employed. Should a triggerable air spark gap or trigatron be used, the leads in the trigatron are mounted between two parallel plates. The rise time of a switch of this type should be in the neighborhood of 7 mμ sec. When a thyratron (rise time of 8 mμ sec., for example) is the switch, its leads are mounted between two hemispherical metal balls.

Several methods exist for determining the temperature of a solid or liquid all based on a radiation law which is true for the radiation from a blackbody furnace. Planck's radiation law for monochromatic radiation is:

$$E\lambda=\lambda^5\frac{C_1}{{}_eC_2/\lambda T_{-1}} \qquad (1)$$

where $C_1=3{,}7413\times10^{-16}$ $W.\ M^2$ and $C_2=14{,}388\mu.°$ K

The integral of Eq. 1 gives the total energy radiated $$E=\sigma T^4$$

where $$\sigma \text{ equals } 5.6686\times10^{-8}\ W/M^2\cdot(°\text{ K})^4 \qquad (2)$$

This is the Stefan-Boltzmann law.

Employing radiation data from two wavelength $\lambda_1$ and $\lambda_2$, the ratio of $E\lambda_1$ to $E\lambda_2$ gives $$\frac{E\lambda 1}{E\lambda 2}=\frac{\lambda 2^5 E\lambda_1 e+C_2/\lambda_1 T}{\lambda 1^5 E\lambda_2 e+C_1/\lambda_2 T}$$

which simplifies to $$INR=\frac{A}{T}+B$$

where $$R=E\lambda_{1/E}\lambda_{21}A=C_2\left(\frac{1}{\lambda 2}=\frac{1}{\lambda 1}\right)$$

and $$B=1N\left(\frac{\lambda 2}{\lambda 1}\right)5$$

The constants A and B are determined by the choice of wavelength and the second radiation constant $C_2$. Usually a source is observed at two or more known temperatures and 1 NR plotted against $1/T$ to yield a calibration curve. This calibration curve may be extrapolated over ranges of temperatures for which the radiometer has a linear response.

Another means of determining the temperature of the explosion is from the equation, $$\frac{d}{dt}[MC_v(T)T]=P-\sigma AT^4-\frac{dE}{dt}\text{ (Hydrodynamic)} \qquad (5)$$

where M is the mass of the filament, and $C_v$ (T) is the specific heat at constant volume. This ranges from 0.1 to 0.7 joules/g./°K for temperatures of interest. T is the wire temperature in °K; P is the electrical power into the wire in watts:

$\sigma$=Stefan-Boltzmann constant= $5.7\times10^{-5}$ erg./sec./cm.²/°K and A is the area of the filament or the exploding surface.

When the filament has reached its maximum tempertrue the rate of change of internal energy would be zero. That is $$\frac{d}{dt}[MC_v(T)T]=0 \qquad (6)$$

Then $$P=\sigma AT^4 \qquad (7)$$

or $$T=\left[\frac{P}{\sigma A}\right]^{1/4} \qquad (8)$$

Thus, it is shown that the temperature is proportional to the fourth root of input power divided by the surface area of the filament so that the smaller the diameter of the exploding element the greater the temperature for a given amount of applied energy.

The maximum power that can be delivered to a resistive load in an RCL circuit is $$P\ \text{max}\cong\frac{V^2}{2\sqrt{\frac{L}{C}}} \qquad (9)$$

where V is the potential to which the capacitor 10 is charged and L and C represent the inductance and capacitance. This clearly shows the requirement of a high voltage capacitor with a low $L/C$ ratio.

While the invention has been described with particular reference to the illustrated embodiment, it will be understood that a variety of circuits in a variety of circuit parameters may be employed to explode the graphite filament depending upon existing conditions and the particular effect desired.

Having thus described my invention, what I claim and desire to obtain by Letters Patent of the United States is:

1. A circuit for producing an explosion of very short duration and characterized by an intense flash of light, high temperature and high velocity shock waves, comprising a graphite filament formed from a number of fine graphite fibers, power means for energizing said filament, condenser means for storing an electrical charge of high potential and switching means for closing the circuit whereby a pulse of high electrical energy is applied to said filament.

2. A circuit according to claim 1 in which the graphite filament is the most resistive element.

3. A circuit for producing an explosion of very short duration and characterized by an intense flash of light, high temperature and high velocity shock waves, comprising a graphite filament formed from a number of fine graphite fibers each approximately 8 to 10 microns in diameter, electrical power means for energizing said filament, condenser means for storing an electrical charge of high potential and switching means for closing the circuit whereby a pulse of high electrical energy is applied to said filament.

4. A circuit according to claim 3 in which the switching means is a triggered gap switch.

5. A circuit according to claim 3 in which the switching means is a thyratron device.

6. A circuit for producing an explosion of very short duration and characterized by an intense flash of light, high temperature and high velocity shock waves, comprising a graphite element formed from a number of fine graphite fibers, condenser means for storing an electrical charge of high potential and rapid rise switching means for closing the circuit whereby a pulse of high electrical energy is applied to said element.

References Cited in the file of this patent

UNITED STATES PATENTS

| | | |
|---|---|---|
| 39,542 | Beardslee | Aug. 18, 1863 |
| 2,514,434 | Windes | July 11, 1950 |
| 2,821,139 | Apstein et al. | Jan. 28, 1958 |
| 2,861,445 | Roth | Nov. 25, 1958 |
| 2,920,569 | Menke et al. | Jan. 12, 1960 |
| 2,924,140 | Scherrer | Feb. 9, 1960 |
| 2,926,566 | Atkins et al. | Mar. 1, 1960 |
| 2,999,179 | Bianchi et al. | Sept. 5, 1961 |